(12) United States Patent
Kohshima

(10) Patent No.: US 10,139,038 B2
(45) Date of Patent: Nov. 27, 2018

(54) SUPPORT APPARATUS

(71) Applicant: One by One Co., Ltd., Higashi-Osaka-shi, Osaka (JP)

(72) Inventor: Kuniharu Kohshima, Higashi-Osaka (JP)

(73) Assignee: ONE BY ONE CO., LTD., Higashi-Osaka-Shi, Osaka (JP)

( * ) Notice: Subject to any disclaimer, the term of this patent is extended or adjusted under 35 U.S.C. 154(b) by 54 days.

(21) Appl. No.: 15/319,605

(22) PCT Filed: Dec. 9, 2014

(86) PCT No.: PCT/JP2014/082477
§ 371 (c)(1),
(2) Date: Dec. 16, 2016

(87) PCT Pub. No.: WO2016/051613
PCT Pub. Date: Apr. 7, 2016

(65) Prior Publication Data
US 2017/0307130 A1    Oct. 26, 2017

(30) Foreign Application Priority Data

Oct. 2, 2014 (JP) ................................. 2014-203769

(51) Int. Cl.
*A47B 5/06* (2006.01)
*F16M 11/00* (2006.01)
(Continued)

(52) U.S. Cl.
CPC .............. *F16M 11/00* (2013.01); *A47B 5/06* (2013.01); *A47B 13/00* (2013.01); *A47B 57/30* (2013.01);
(Continued)

(58) Field of Classification Search
CPC ....... A47B 57/42; A47B 57/48; A47B 57/482; A47B 57/485
(Continued)

(56) References Cited

U.S. PATENT DOCUMENTS 3,469,711 A * 9/1969 Swaneck ................ A47B 57/16
 108/108
4,370,838 A * 2/1983 Vermillion .......... E04F 13/0814
 52/127.9

(Continued)

FOREIGN PATENT DOCUMENTS

DE      102 28 320 C1    12/2003
JP      H 10-33290 A      2/1998
(Continued)

OTHER PUBLICATIONS

Extended European Search Report dated Feb. 2, 2018, issued by the European Patent Office in corresponding European Application No. 14903237.7 (7 pages).
(Continued)

*Primary Examiner* — Matthew W Ing
(74) *Attorney, Agent, or Firm* — Buchanan Ingersoll & Rooney PC

(57) ABSTRACT

A fixture member includes: a pillar having a substantially horizontal sectional shape that is a U-shape; a plurality of chip portions fixed in the pillar; and an opening formed by a lower surface of one chip portion, an upper surface of another chip portion, and opposed inner side surfaces of the pillar. A support member is detachably attached to the opening. A receiving member is fixed to the support member. The chip portion has an upper slope surface, a first horizontal surface, and a lower slope surface. The support member has: a first contact surface to contact with the lower slope surface; a second contact surface to contact with the upper slope surface; a third contact surface to contact with
(Continued)

the first horizontal surface; and a fourth contact surface and a fifth contact surface to contact with the opposed inner side surfaces of the fixture member.

10 Claims, 17 Drawing Sheets

(51) Int. Cl.
*A47F 5/00* (2006.01)
*A47B 57/32* (2006.01)
*A47B 96/06* (2006.01)
*A47B 13/00* (2006.01)
*A47B 57/30* (2006.01)
*A47B 57/42* (2006.01)
*A47B 57/50* (2006.01)
*A47B 5/00* (2006.01)

(52) U.S. Cl.
CPC .............. *A47B 57/32* (2013.01); *A47B 96/06* (2013.01); *A47F 5/00* (2013.01); *A47B 5/00* (2013.01); *A47B 57/42* (2013.01); *A47B 57/50* (2013.01)

(58) Field of Classification Search
USPC ......................................................... 52/36.6
See application file for complete search history.

(56) References Cited

U.S. PATENT DOCUMENTS

| | | | | |
|---|---|---|---|---|
| 4,581,859 A | * | 4/1986 | Doke | ........................ E04B 2/74 |
| | | | | 52/238.1 |
| 4,839,999 A | * | 6/1989 | Clemens | ............ A47B 96/1416 |
| | | | | 52/36.6 |
| 5,375,924 A | | 12/1994 | Pohl et al. | |
| 2008/0197253 A1 | * | 8/2008 | Thompson | ............. A47B 57/42 |
| | | | | 248/220.22 |

FOREIGN PATENT DOCUMENTS

| | | |
|---|---|---|
| JP | 3047139 U | 3/1998 |
| JP | 2001-303742 A | 10/2001 |
| JP | 2006-280810 A | 10/2006 |
| JP | 2012-249721 A | 12/2012 |

OTHER PUBLICATIONS

International Search Report (PCT/ISA/210) dated Mar. 17, 2015, by the Japan Patent Office as the International Searching Authority for International Application No. PCT/JP2014/082477.
Written Opinion (PCT/ISA/237) dated Mar. 17, 2015, by the Japan Patent Office as the International Searching Authority for International Application No. PCT/JP2014/082477.

* cited by examiner (a)

(b)

(a)

(b)

(a)

(b)

(c)

(d)

(e)

(a)

(b)

(c)

(d)

(e)

(a)

(b)

(c)

(d)

(e)

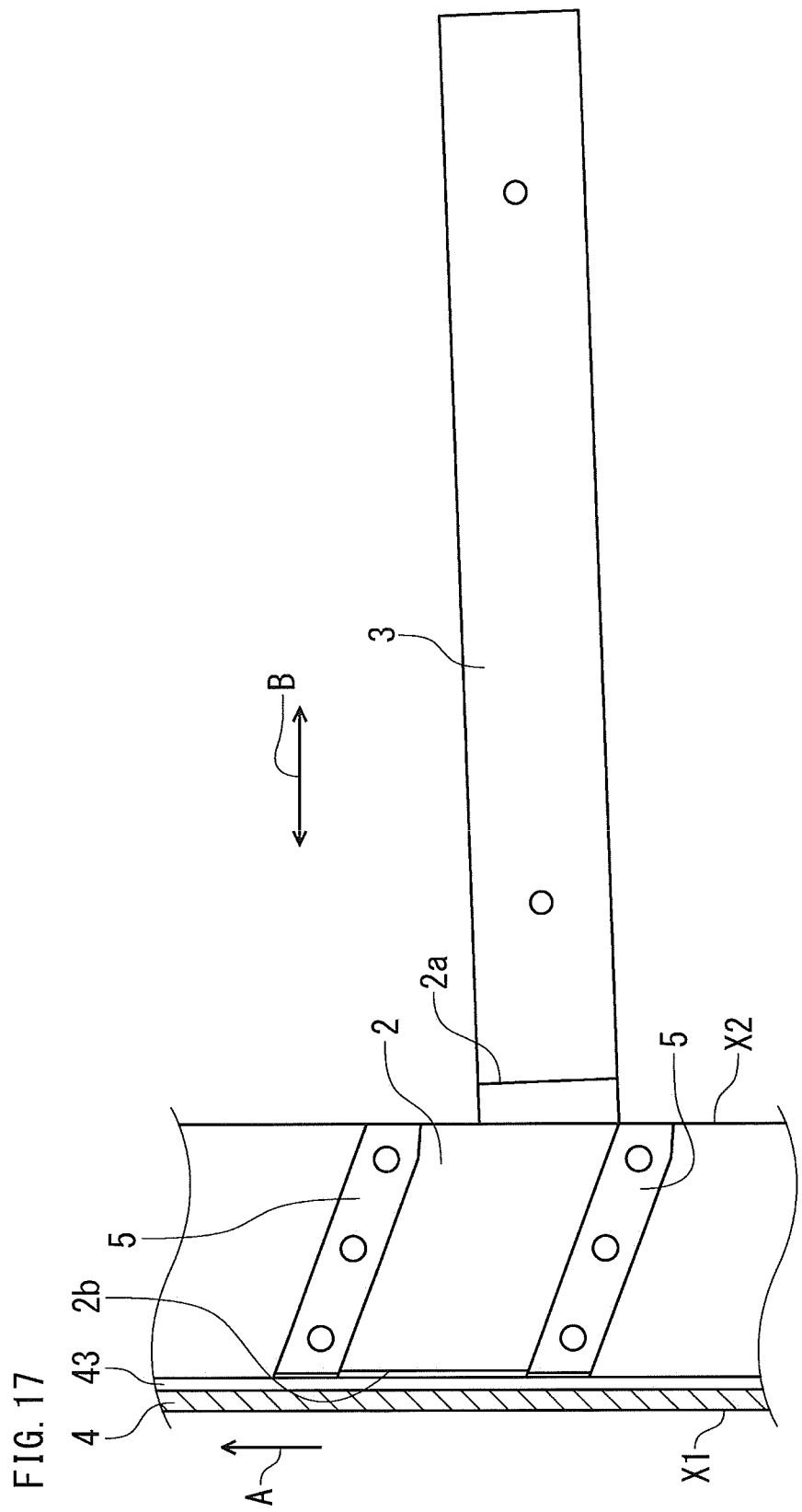

SUPPORT APPARATUS

TECHNICAL FIELD

The present invention relates to a support apparatus that allows for: free change in the vertical direction of a position where a load (corresponding to something to be supported by a support apparatus, the same applies hereafter) is placed; suppression of staggering of a portion supporting the load; reduction of exposure of an attachment part of the portion supporting the load; and reduction in manufacturing cost.

BACKGROUND ART

In a conventional shelf apparatus, pillars arranged at the right and left each have a rectangular sectional shape and are made of, for example, steel. In at least front surfaces of the pillars, multiple engagement holes are formed in two columns at the right and left. The engagement holes allow a bracket for supporting a side end portion of a shelf board to be engaged therewith. The bracket which extends in a front-rear direction has, at an upper end, a horizontal piece which is oriented inward between the right and left pillars and used for supporting the shelf board, and has, at a rear end, three engagement claws which extend downward and can be engaged with the engagement holes of the corresponding pillar (for example, see Patent Document 1).

A conventional product support apparatus includes: a cylindrical fixture member having a right-prism hollow hole which opens at an upper end and has a rectangular sectional shape, the fixture member being fixed to a pillar with the hollow hole inclined; and a load support member having a load receiving portion and an engagement portion which is provided contiguously to a rear end of the load receiving portion with a predetermined inclination angle provided therebetween and is formed in a rectangular right-prism shape having a sectional area smaller than that of the hollow hole by a minute dimension so that the engagement portion can be inserted into the hollow hole of the fixture member. In order to prevent an end (rear) surface of the engagement portion from contacting with the fixture member when the engagement portion is inserted into the hollow hole, the length of the engagement portion is set to be shorter than the depth dimension of the hollow hole. After the engagement portion of the load support member is straightly inserted in an extractable manner into the hollow hole of the fixture member from its upper end, by the own weight of the load support member, two parts of an end (rear) upper edge and a base (front) lower edge of the engagement portion are caused to contact with a hollow-hole surface of the fixture member so as to be held therein, whereby the load support member is engaged with the fixture member (for example, see Patent Document 2).

CITATION LIST

Patent Document

Patent Document 1: Japanese Laid-Open Patent Publication No. 2006-280810
Patent Document 2: Japanese Laid-Open Patent Publication No. 2012-249721

SUMMARY OF THE INVENTION

Problems to be Solved by the Invention

In the conventional shelf apparatus described in Patent Document 1, although a position where the bracket for supporting a shelf is attached can be freely changed in the vertical direction, since the bracket for supporting a shelf is attached by means of the engagement claws, staggering occurs, and since the bracket for supporting a shelf is attached by means of a plurality of engagement claws, the attachment part is greatly exposed.

In the conventional product support apparatus described in Patent Document 2, when the load support member for supporting a shelf is attached, staggering is less likely to occur and an attachment part of the load support member for supporting a shelf is hardly exposed. However, after the attachment, the position where the load support member for supporting a shelf is attached is set in advance in the vertical direction, and therefore cannot be freely changed. In addition, in the case of allowing for free change in the vertical direction of the position where the load support member for supporting a shelf is attached, it is required to provide multiple load support members, resulting in high cost.

The present invention has been made to solve the above problems, and an object of the present invention is to provide a support apparatus that allows for: free change in the vertical direction of a position where a load is placed; suppression of staggering of a portion supporting the load in attachment; reduction of exposure of an attachment part of the portion supporting the load; and reduction in manufacturing cost.

Solution to the Problems

A support apparatus of the present invention includes: a fixture member including: a pillar having an orientation kept in a substantially vertical direction and having a substantially horizontal sectional shape that is a U-shape; a plurality of chip portions fixed inside a U-shaped structure of the pillar and spaced from each other in a height direction of the pillar; and an opening formed by a lower surface of an upper one of the chip portions next to each other in the height direction of the pillar, an upper surface of a lower one of the chip portions, and opposed inner side surfaces inside the U-shaped structure of the pillar; a support member detachably attached to the opening of the fixture member; and a receiving member fixed to the support member and supporting a load. The upper surface of each chip portion has an upper slope surface sloped so as to become higher from a closed side of the U-shaped structure of the pillar toward an open side thereof, and a first horizontal surface which is formed contiguously to the upper slope surface and reaches the open side of the U-shaped structure of the pillar. The lower surface of each chip portion has a lower slope surface sloped so as to become higher from the closed side of the U-shaped structure of the pillar toward the open side thereof, to reach the open side. An upper surface of the support member has a first contact surface to contact with the lower slope surface. A lower surface of the support member has a second contact surface to contact with the upper slope surface, and a third contact surface to contact with the first horizontal surface, the third contact surface being contiguous to the second contact surface. Opposed side surfaces of the support member respectively have a fourth contact surface and a fifth contact surface to contact with the opposed inner side surfaces of the U-shaped structure of the fixture member.

Another support apparatus of the present invention includes: a fixture member including: a pillar having an orientation kept in a substantially vertical direction and having a substantially horizontal sectional shape that is a U-shape; a plurality of chip portions fixed inside a U-shaped structure of the pillar and spaced from each other in a height direction of the pillar; and an opening formed by a lower surface of an upper one of the chip portions next to each other in the height direction of the pillar, an upper surface of a lower one of the chip portions, and opposed inner side surfaces inside the U-shaped structure of the pillar; a support member detachably attached to the opening of the fixture member; and a receiving member fixed to the support member and supporting a load. The upper surface of each chip portion has an upper slope surface sloped so as to become lower from a closed side of the U-shaped structure of the pillar toward an open side thereof. The lower surface of each chip portion has a lower slope surface sloped so as to become lower from the closed side of the U-shaped structure of the pillar toward the open side thereof, to reach the open side, and a first horizontal surface which is formed contiguously to the lower slope surface and reaches the open side of the U-shaped structure of the pillar. A lower surface of the support member has a first contact surface to contact with the lower slope surface. An upper surface of the support member has a second contact surface to contact with the upper slope surface, and a third contact surface to contact with the first horizontal surface, the third contact surface being contiguous to the second contact surface. Opposed side surfaces of the support member respectively have a fourth contact surface and a fifth contact surface to contact with the opposed inner side surfaces of the U-shaped structure of the fixture member.

Effect of the Invention

The above support apparatuses of the present invention allow for: free change in the vertical direction of a position where a load is placed; suppression of staggering of a portion supporting the load; reduction of exposure of an attachment part of the portion supporting the load; and reduction in manufacturing cost.

BRIEF DESCRIPTION OF THE DRAWINGS

FIG. 16a and FIG. 16b are a right side view and a left side sectional view showing a configuration of the fixture member of the support apparatus in embodiment 2 of the present invention.

FIG. 17 is a left side partial sectional view showing a state in which the support member of the support apparatus shown in FIG. 14, FIG. 15.

DESCRIPTION OF EMBODIMENTS

Embodiment 1

Figure 1:
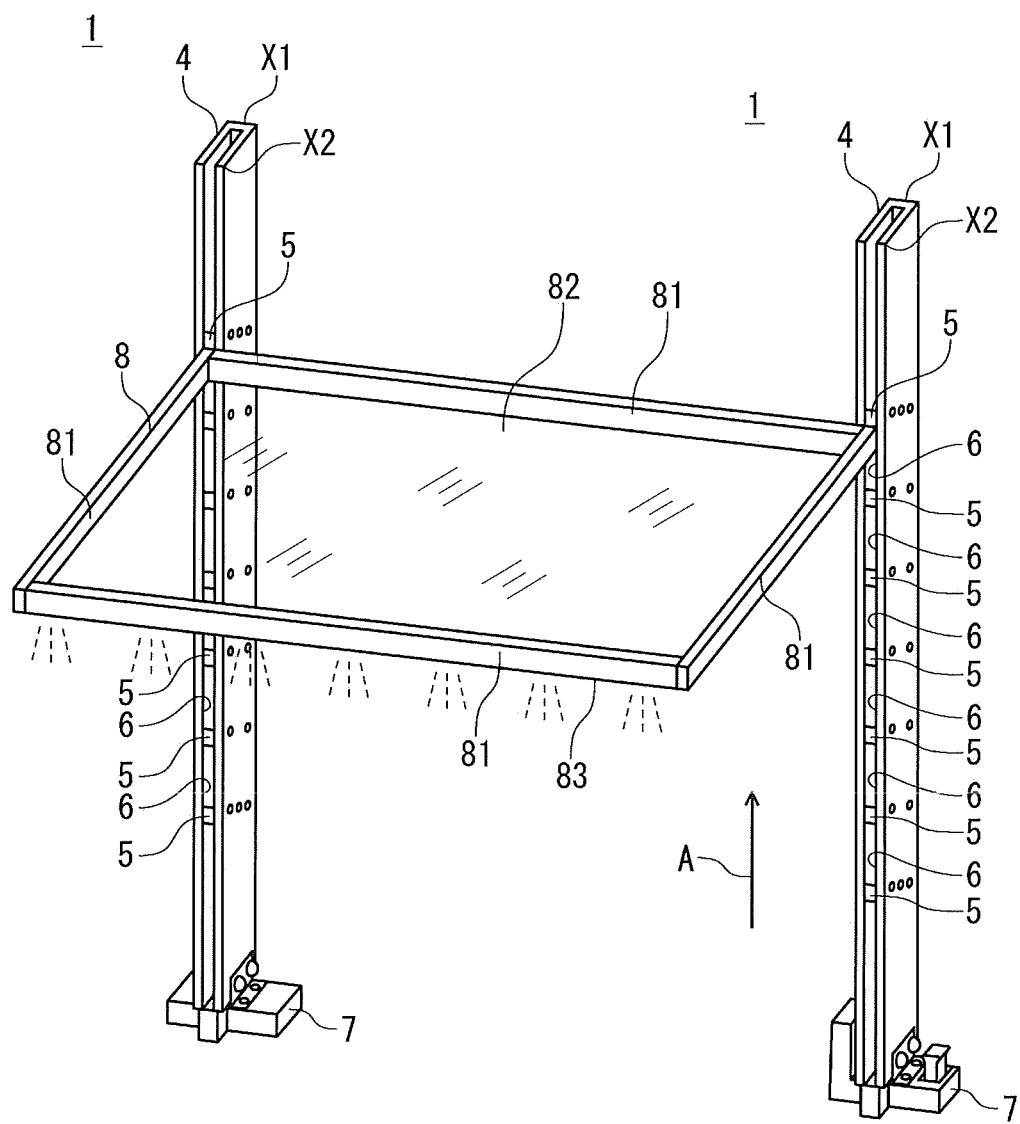
FIG. 1 is a perspective view showing a configuration of a support apparatus in embodiment 1 of the present invention.
Figure 2:
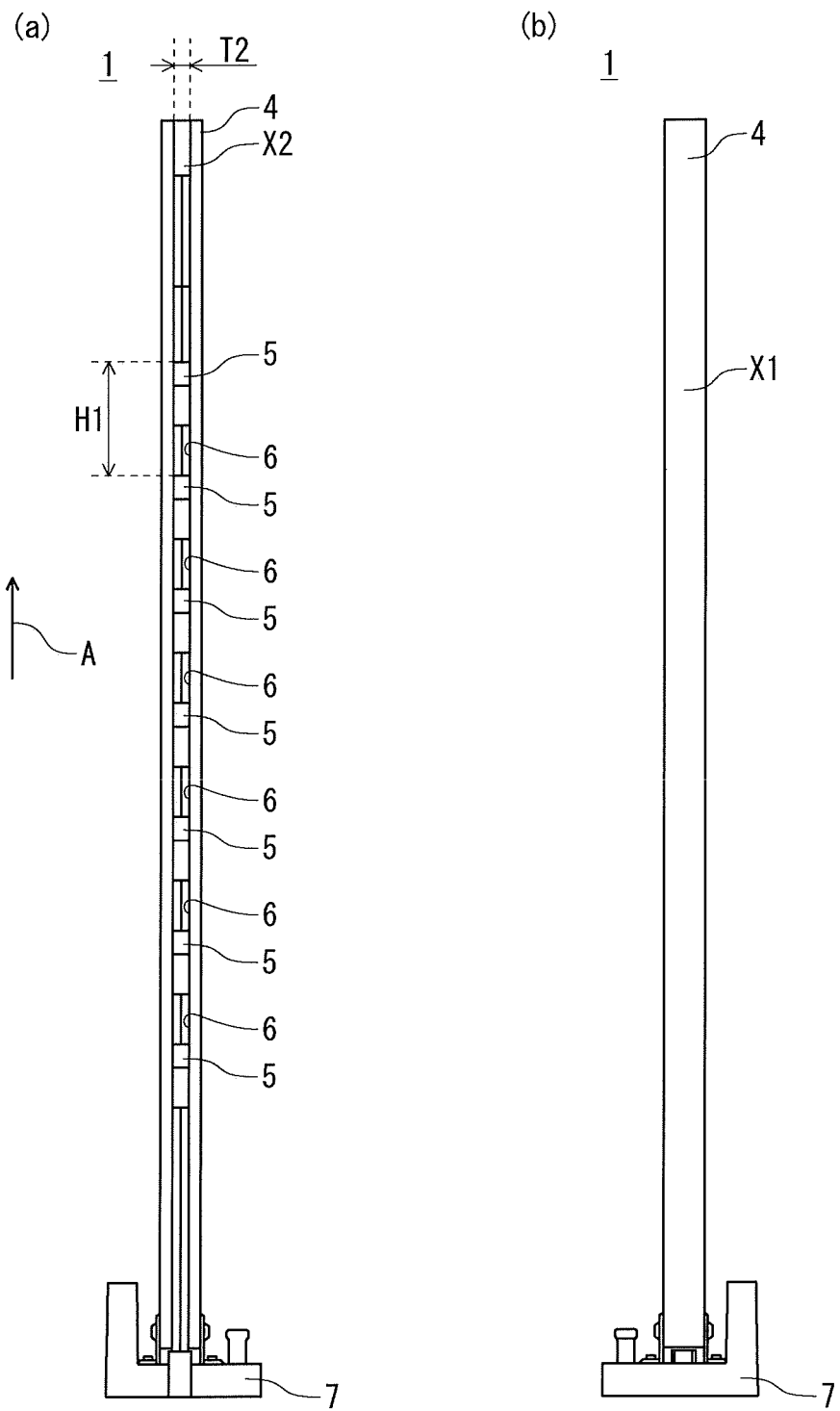
FIG. 2a and FIG. 2b are a front view and a back view showing a configuration of a fixture member of the support apparatus shown in FIG. 1.
Figure 3:
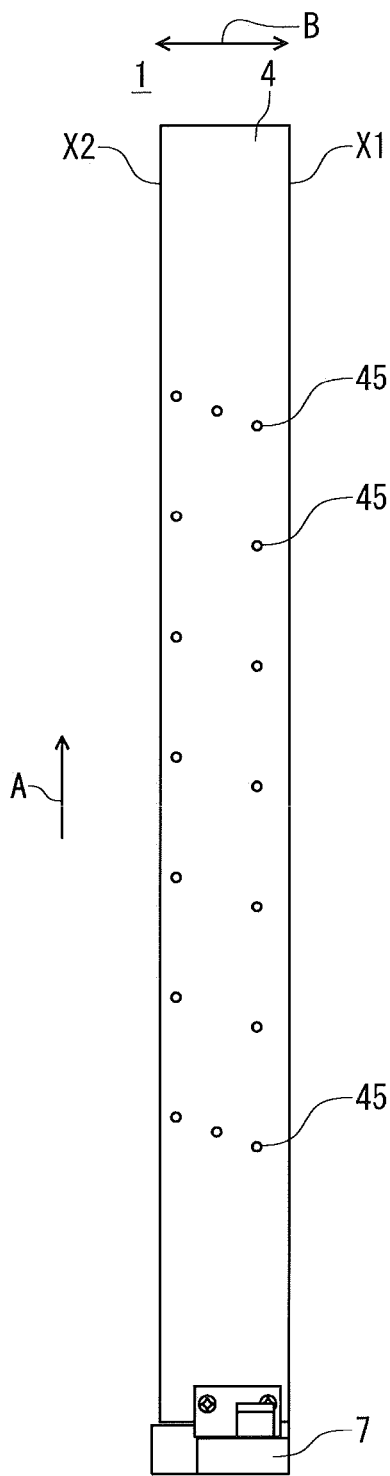
FIG. 3a and FIG. 3b are a right side view and a left side sectional view showing the configuration of the fixture member of the support apparatus shown in FIG. 1.
Figure 3:
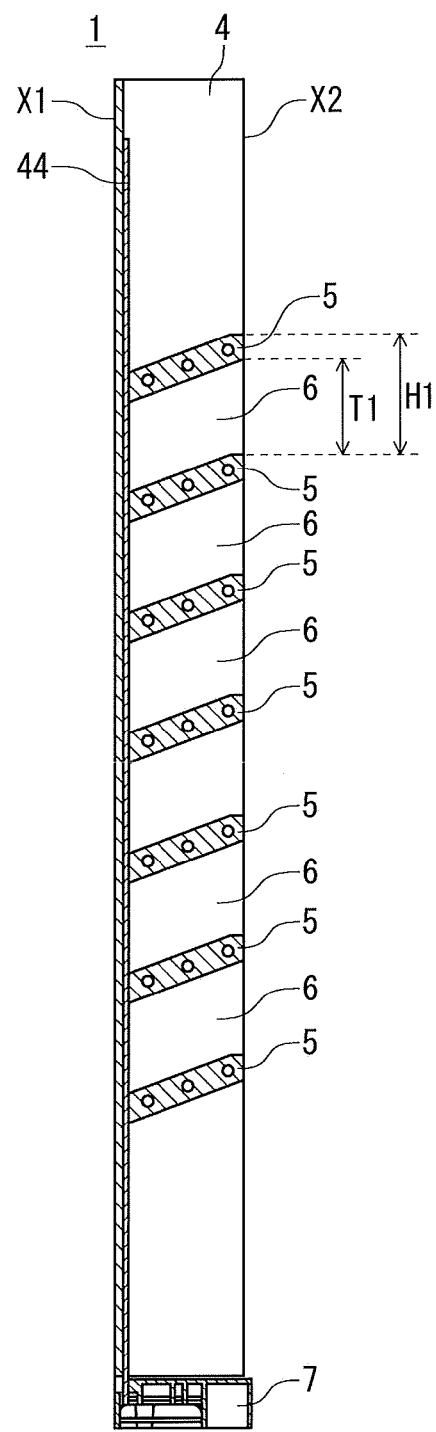
Figure 4:
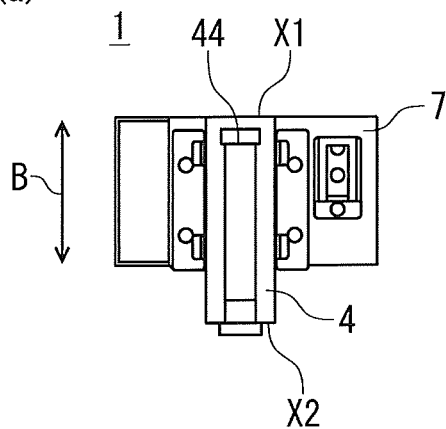
FIG. 4a and FIG. 4b are a plan view and a bottom view showing the configuration of the fixture member of the support apparatus shown in FIG. 1.
Figure 4:
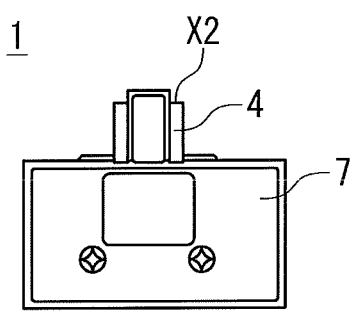

Hereinafter, embodiments of the present invention will be described. FIG. 1 is a view showing a configuration of a support apparatus in embodiment 1 of the present invention. FIG. 2 is a view showing a configuration of a fixture member of the support apparatus shown in FIG. 1. FIG. 2(a) is a front view and FIG. 2(b) is a back view. FIG. 3 is a view showing a configuration of the fixture member of the support apparatus shown in FIG. 1. FIG. 3(a) is a right side view and FIG. 3(b) is a left side sectional view. FIG. 4 is a view showing a configuration of the fixture member of the support apparatus shown in FIG. 1. FIG. 4(a) is a plan view and FIG. 4(b) is a bottom view.

Figure 5:
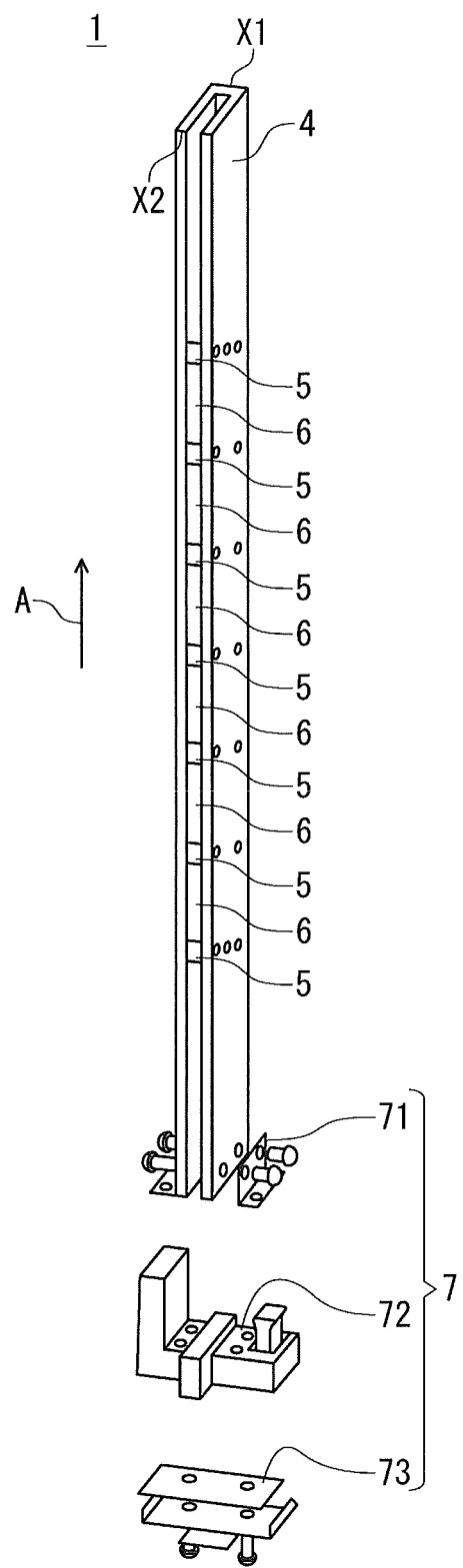
FIG. 5 is a perspective view showing an assembly method for the fixture member of the support apparatus shown in FIG. 1.
Figure 6:
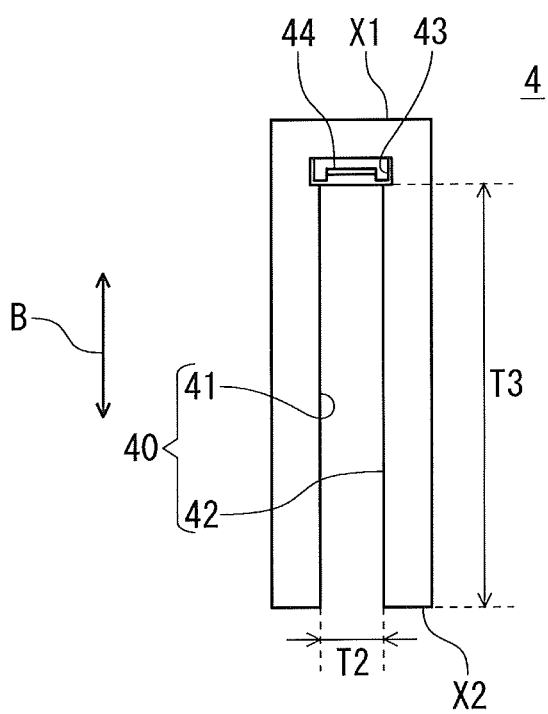
FIG. 6 is a plan view showing a configuration of a pillar of the fixture member of the support apparatus shown in FIG. 1.
Figure 7:
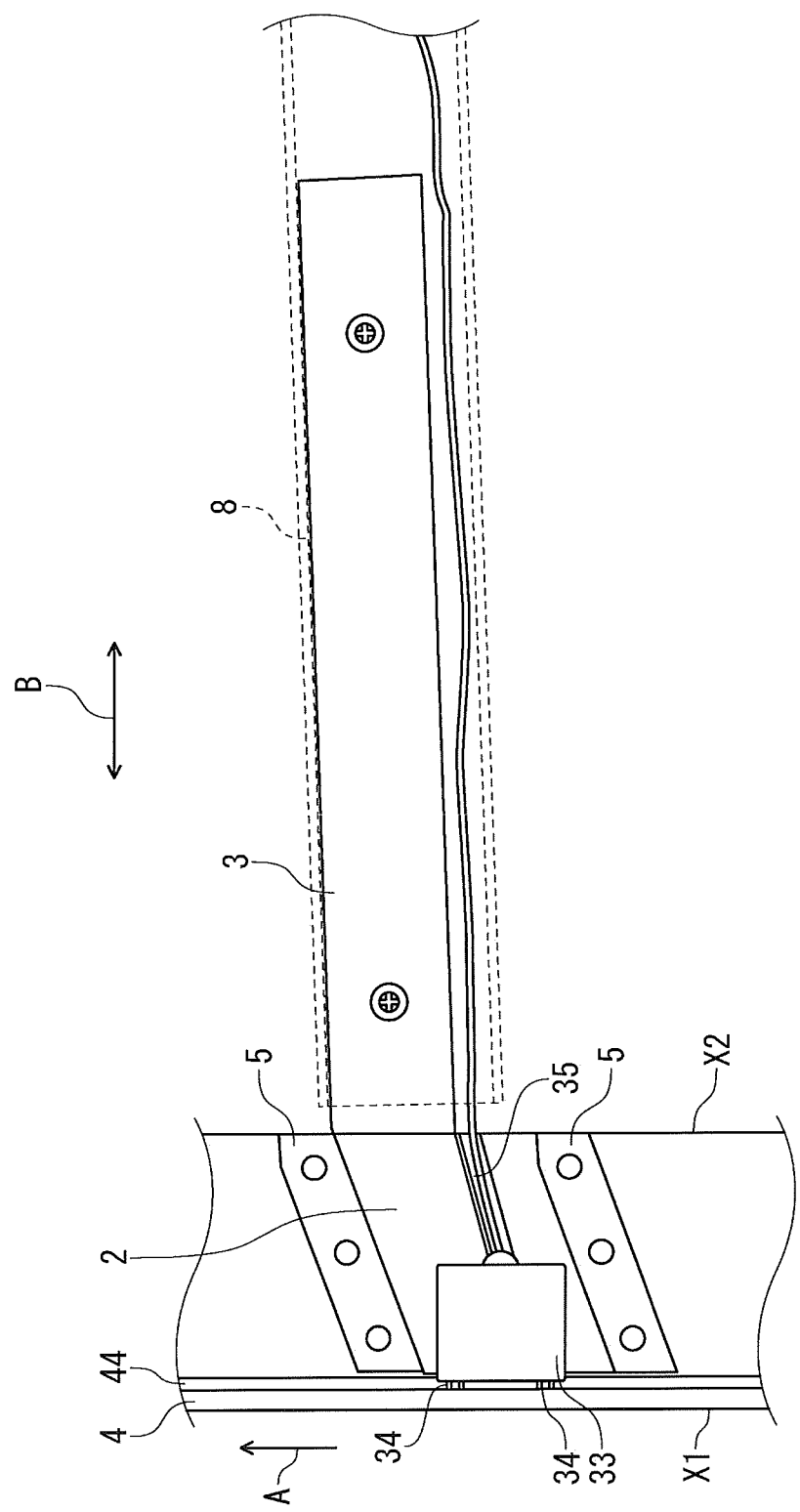
FIG. 7 is a left side partial sectional view showing a state in which a support member of the support apparatus shown in FIG. 1 is inserted into the fixture member and a load is mounted on a receiving member.
Figure 8:
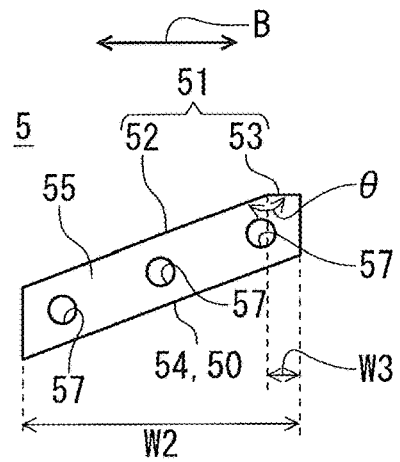
FIG. 8a to FIG. 8e are a left side view, a plan view, a bottom view, a front view, and a back view showing a configuration of a chip portion of the fixture member shown in FIG. 7.
Figure 8:
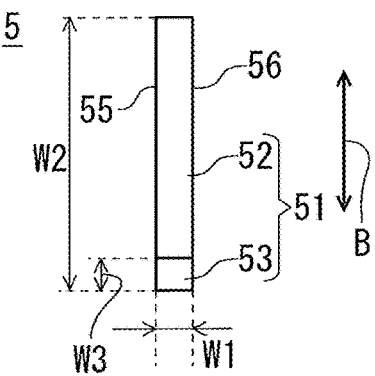
Figure 8:
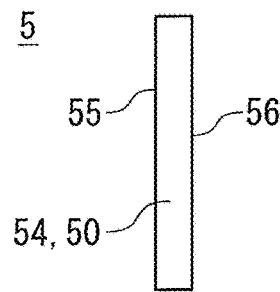
Figure 8:
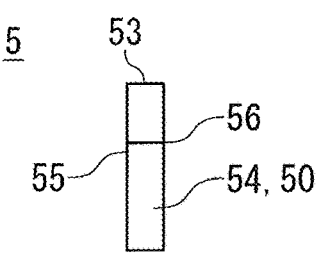
Figure 8:
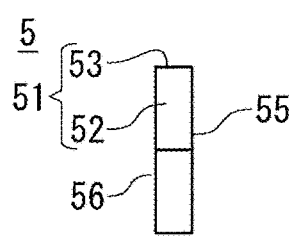

FIG. 5 is a perspective view showing an assembly method for the fixture member of the support apparatus shown in FIG. 1. FIG. 6 is a plan view showing a configuration of a pillar of the fixture member of the support apparatus shown in FIG. 1. FIG. 6 shows the details of the plan view of the pillar. In some figures other than FIG. 6, the details of the pillar are not shown. FIG. 7 is a left side partial sectional view showing a state in which a support member of the support apparatus shown in FIG. 1 is inserted into the fixture member and a load is mounted on a receiving member. FIG. 8 is a view showing a configuration of a chip portion of the fixture member shown in FIG. 7. FIG. 8(a) is a left side view, FIG. 8(b) is a plan view, FIG. 8(c) is a bottom view, FIG. 8(d) is a front view, and FIG. 8(e) is a back view. A right side view of the chip portion of the fixture member is symmetric with that in FIG. 8(a).

Figure 9:
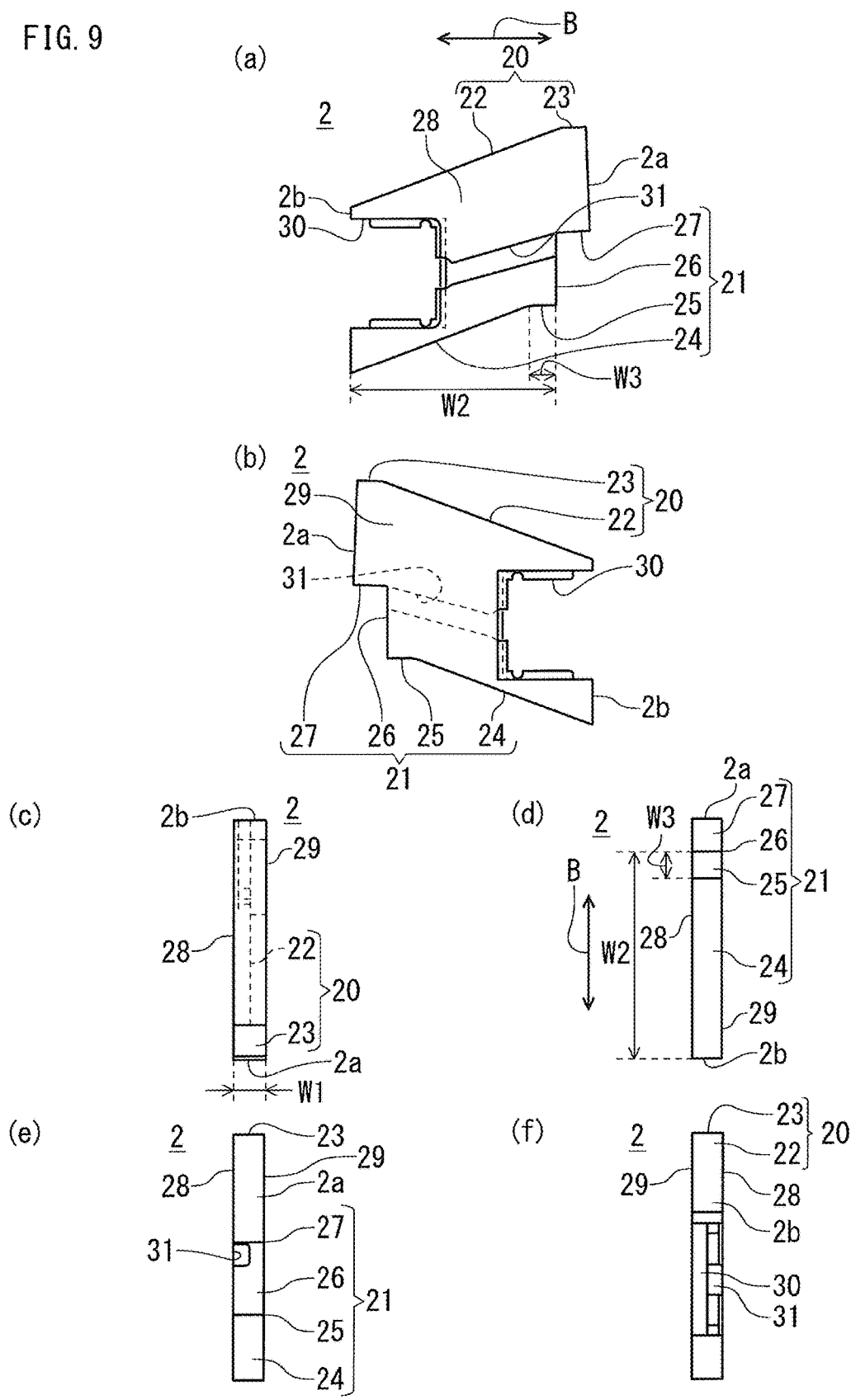
FIG. 9a to FIG. 9f are a left side view, a right side view, a plan view, a bottom view, a front view, and a back view showing a configuration of the support member shown in FIG. 7.
Figure 10:
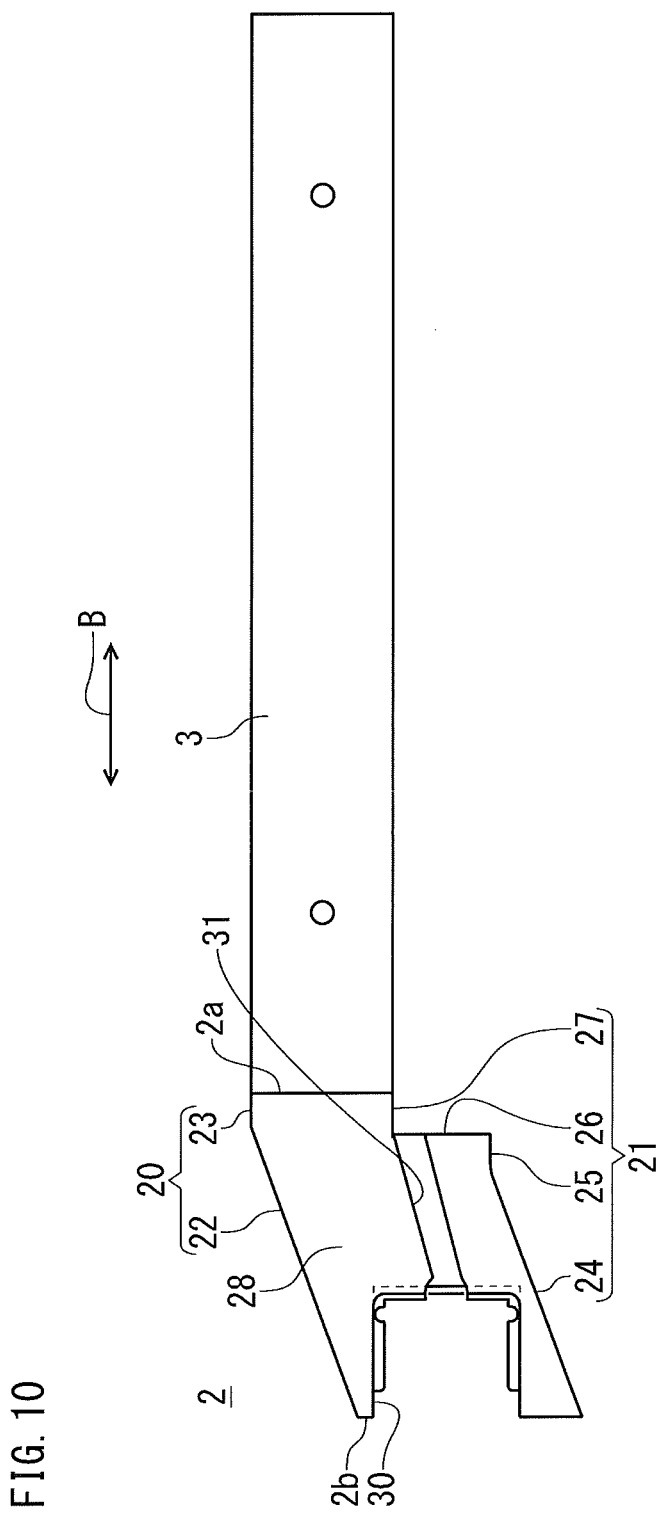
FIG. 10 is a left side view showing a configuration of the support member and the receiving member of the support apparatus shown in FIG. 7.
Figure 11:
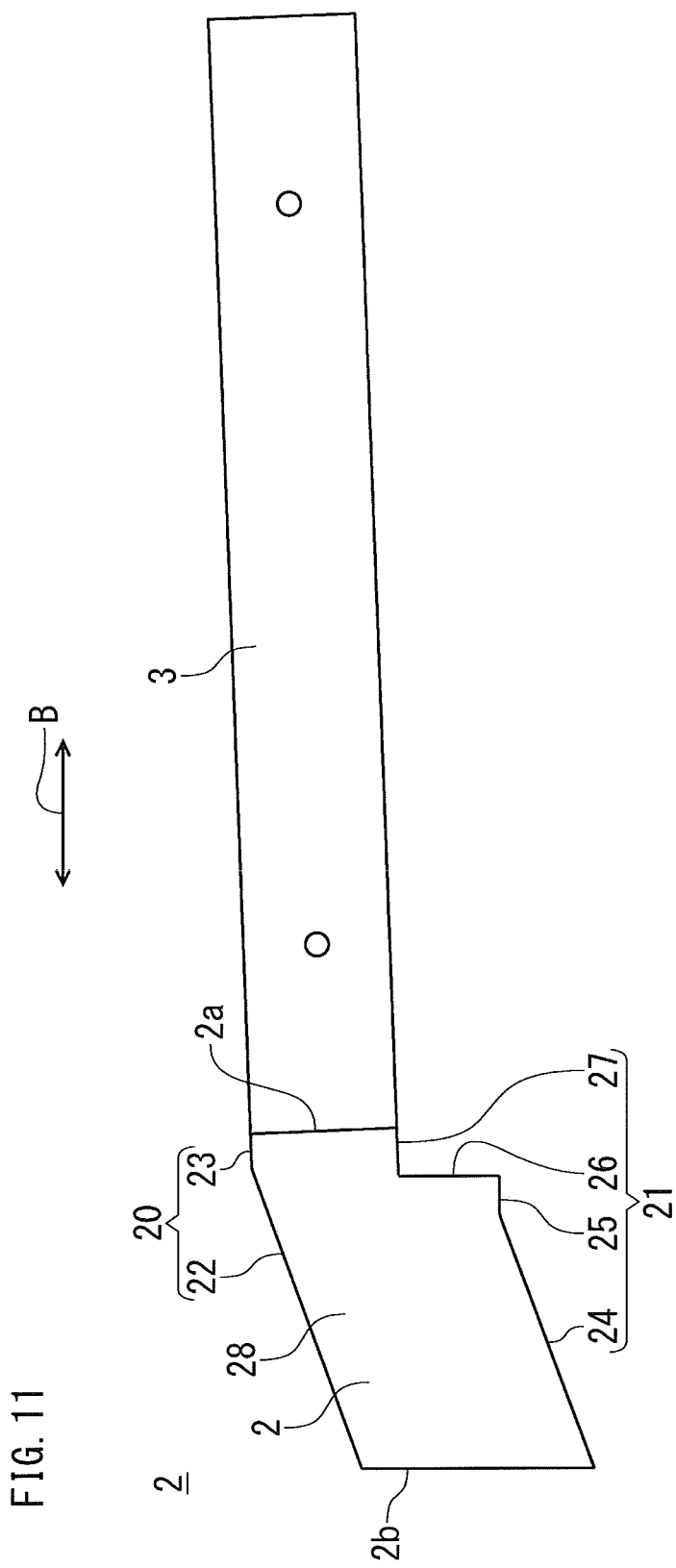
FIG. 11 is a left side view showing another configuration of the support member and the receiving member of the support apparatus shown in FIG. 1.
Figure 12:
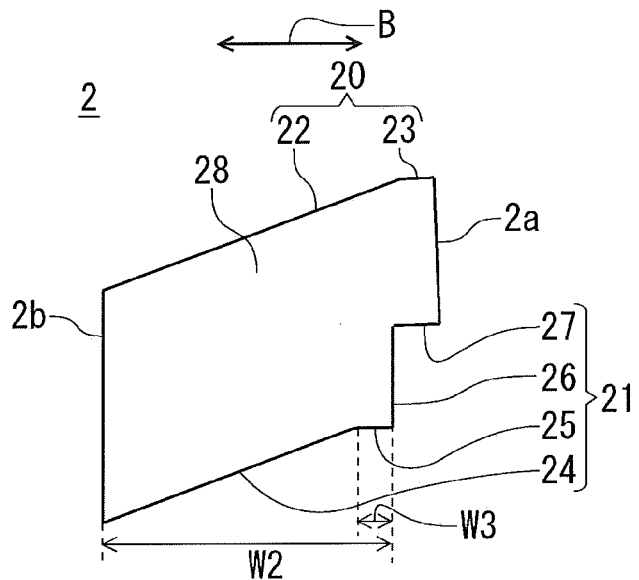
FIG. 12a to FIG. 12e are a left side view, a plan view, a bottom view, a front view, and a back view showing a configuration of the support member shown in FIG. 11.
Figure 12:
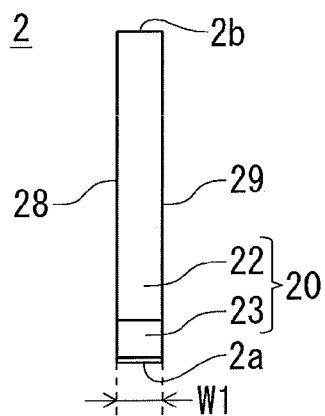
Figure 12:
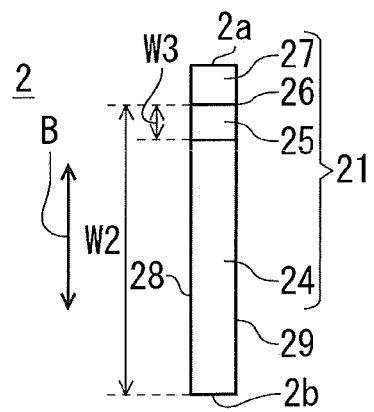
Figure 12:
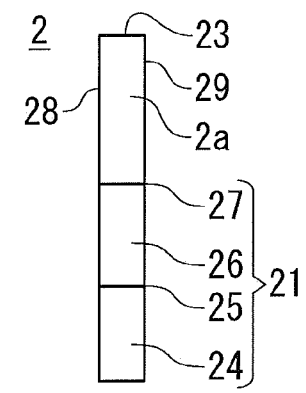
Figure 12:
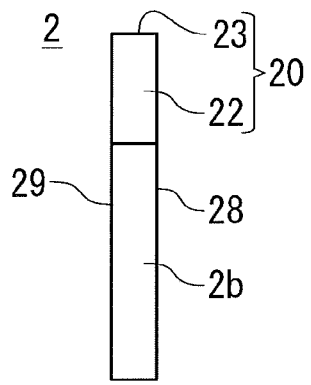
Figure 13:
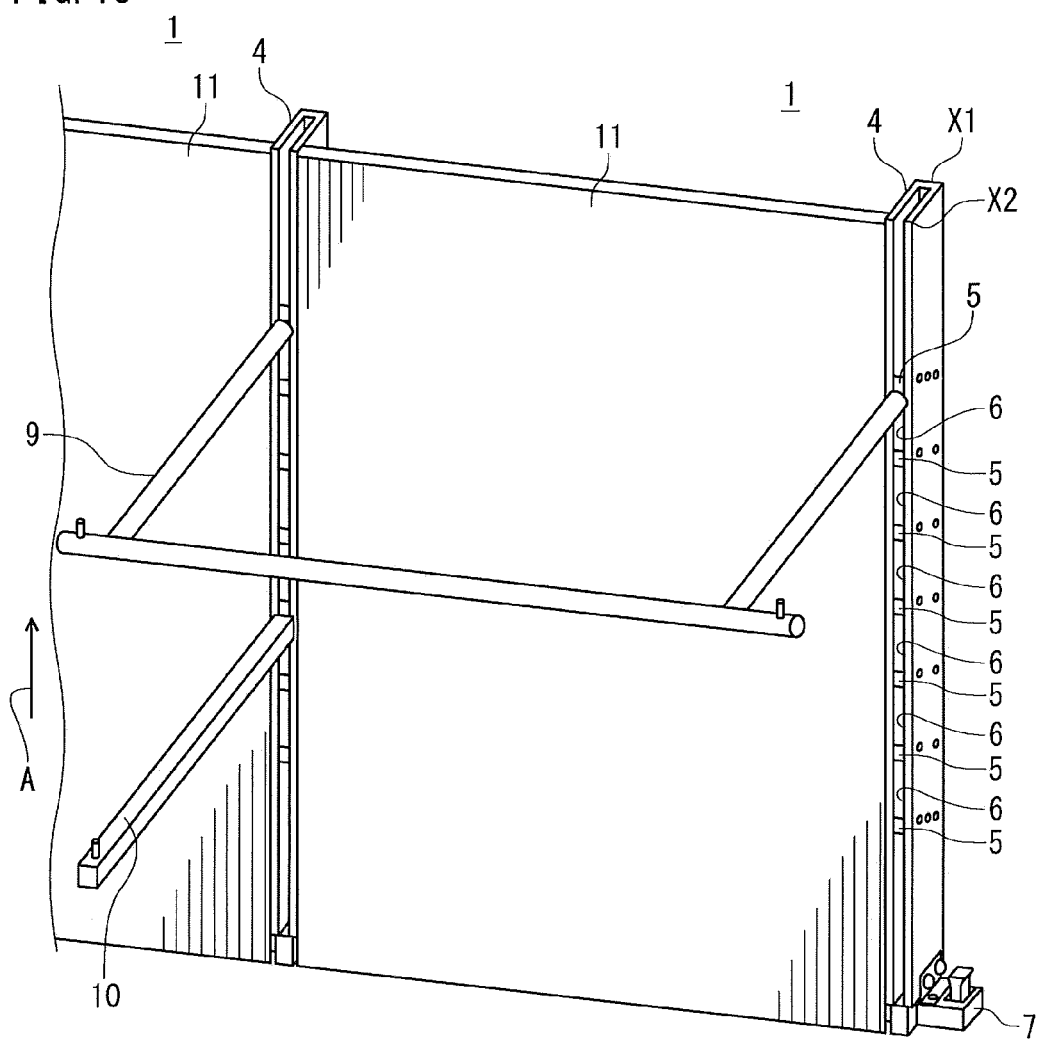
FIG. 13 is a perspective view showing another configuration of a load part of the support apparatus in embodiment 1 of the present invention.

FIG. 9 is a view showing a configuration of the support member shown in FIG. 7. FIG. 9(a) is a left side view, FIG. 9(b) is a right side view, FIG. 9(c) is a plan view, FIG. 9(d) is a bottom view, FIG. 9(e) is a front view, and FIG. 9(f) is a back view. FIG. 10 is a left side view showing a configuration of the support member and the receiving member of the support apparatus shown in FIG. 7. In FIG. 10, a power supply portion of the support member is not shown. FIG. 11 is a left side view showing another configuration of the support member and the receiving member of the support apparatus shown in FIG. 1. FIG. 12 is a view showing a configuration of the support member shown in FIG. 11. FIG. 12(a) is a left side view, FIG. 12(b) is a right side view, FIG. 12(c) is a plan view, FIG. 12(d) is a bottom view, FIG. 12(e) is a front view, and FIG. 12(f) is a back view. FIG. 13 is a perspective view showing another configuration of a load part of the support apparatus in embodiment 1 of the present invention.

In the drawings, the support apparatus is composed of a fixture member 1, a support member 2, and a receiving member 3. These members are made of, for example, aluminum material which is excellent in workability and durability. Without limitation to aluminum material, these members may be made of steel material which is low in cost. The material for these members may be set as appropriate in accordance with purpose and cost.

The fixture member 1 includes a pillar 4, a plurality of chip portions 5, and an opening 6.

The pillar 4 is placed on, for example, a floor with use of a placement member 7. Therefore, the orientation of the pillar 4 is kept in a substantially vertical direction A. The substantially horizontal sectional shape of the pillar 4 along a substantially horizontal direction B is a U-shape.

The placement member 7 is composed of an L-shaped member portion 71, a power supply connection portion 72, and a bottom plate portion 73. The L-shaped member portion 71 is used for placing the pillar 4.

The power supply connection portion 72 is used for supplying power to a wiring portion described later of the pillar 4.

The bottom plate portion 73 is used for mounting the L-shaped member portion 71 and the power supply connection portion 72 thereon.

The power supply connection portion 72 for supplying power need not be provided for both of a pair of the pillars 4, but may be provided for only one of them. Therefore, in FIG. 1, the placement member 7 located at the left in the drawing does not have the power supply connection portion 72.

In the present embodiment 1, the case of using the placement member 7 to place the pillar 4 on a floor is shown as an example. However, without limitation thereto, for example, the pillar 4 may be attached to a ceiling. Alternatively, the pillar 4 may be placed along a wall surface. Thus, the pillar 4 in any case or in any shape can be placed in the same manner as long as the orientation of the pillar 4 is kept in the substantially vertical direction A. Here, the pillar 4 and the placement member 7 are formed as independent parts, as an example. However, the pillar 4 may be formed to also have a function of the placement member 7.

A plurality of the chip portions 5 are fixed inside the U-shaped structure of the pillar 4.

The positions where the chip portions 5 are fixed are distant from each other via constant intervals H1 in a height direction A of the pillar 4. The substantially vertical direction A and the height direction A are the same direction, and are denoted by the same reference character. This also applies hereafter, and therefore the explanation thereof will be omitted as appropriate.

The interval H is generally set based on a range in which positioning in the height direction A is required in displaying a product or the like on the support apparatus. For example, the interval H1 may be set in a range from 40 mm to 55 mm as appropriate. For example, the interval H1 may be set at 42 mm.

Each opening 6 is formed by the pillar 4 and the chip portions 5.

That is, each opening 6 is formed by: a lower surface 50 of the upper one of the two chip portions 5 next to each other in the height direction A of the pillar 4; an upper surface 51 of the lower one of the two chip portions 5; and a first inner side surface 41 and a second inner side surface 42 of opposed inner side surfaces 40 inside the U-shaped structure of the pillar 4.

A wiring groove 43 is formed on a closed side X1 of the pillar 4. In the wiring groove 43, a wiring portion 44 for feeding power from outside is provided. In the pillar 4, screw fastening portions 45 are formed for fixing the plurality of chip portions 5.

The wiring portion 44 is needed only in the case of placing a load that requires a power supply, but need not be provided in the case where a power supply is not required. Therefore, in this case, the wiring groove 43 may not be formed. In the case where a power supply is not required but the wiring groove 43 is formed, the wiring portion 44 need not be provided in the wiring groove 43.

The upper surface 51 of the chip portion 5 is formed by an upper slope surface 52 and a first horizontal surface. The upper slope surface 52 is sloped so as to become higher from the closed side X1 of the U-shaped structure of the pillar 4 toward an open side X2 thereof. The first horizontal surface 53 is formed on the open side X2 of the U-shaped structure of the pillar 4, contiguously to the upper slope surface 52. The lower surface 50 of the chip portion 5 is formed by a lower slope surface 54. The lower slope surface 54 is sloped so as to become higher from the closed side X1 of the U-shaped structure of the pillar 4 toward the open side X2 thereof, to reach the open side X2. The upper slope surface 52 has a slope angle θ of about 160 degrees with respect to the substantially horizontal direction B. About 160 degrees of the slope angle θ is an optimum example for supporting a load. However, even if there is an error of about ±2 degrees from the above value, the same effect is provided.

The lower slope surface 54 is parallel with the upper slope surface 52. Each chip portion 5 contacts with the opposed inner side surfaces 40 of the U-shaped structure of the pillar 4 of the fixture member 1. Therefore, the chip portion 5 has a first side surface 55 which contacts with the first inner side surface 41, and a second side surface 56 which contacts with the second inner side surface 42. The chip portion 5 is formed in such a simple shape that a sectional shape thereof along the substantially vertical direction is rectangular. The chip portion 5 has a screw hole 57 for fixing the chip portion 5 inside the U-shaped structure of the pillar 4, and the screw hole 57 penetrates from the first side surface 55 to the second side surface 56.

A length T1 in the height direction A of the opening 6 is five times or more greater than a length T2 in the width direction of the opening 6. For example, the opening 6 may have the length T1 of 33 mm and the length T2 of 6.2 mm. A length T3 in the substantially horizontal direction B of the opening 6 may be 39 mm. A length W1 in the width direction of the chip portion 5 may be 6 mm, a length W2 in the substantially horizontal direction B of the chip portion 5 may be 38 mm, and a length W3 in the substantially horizontal direction B of the first horizontal surface 53 of the chip portion 5 may be 5 mm.

The support member 2 is detachably attached at any of the plurality of openings 6 formed in the fixture member 1. The support member 2 has an upper surface 20 formed by a first contact surface 22 and a second horizontal surface 23. The first contact surface 22 is to contact with the lower slope surface 54. The second horizontal surface 23 is contiguous to the first contact surface 22. The second horizontal surface 23 protrudes to outside of the opening 6 when the support member 2 is inserted into the opening 6.

The support member 2 has a lower surface 21 formed by a second contact surface 24, a third contact surface 25, a vertical surface 26, and a third horizontal surface 27. The second contact surface 24 is to contact with the upper slope surface 52. The third contact surface 25 is to contact with the first horizontal surface 53 and is contiguous to the second contact surface 24. The vertical surface 26 is contiguous to the second contact surface 24. The third horizontal surface 27 is contiguous to the vertical surface 26. The third horizontal surface 27 protrudes to outside of the opening 6 when the support member 2 is inserted into the opening 6.

In the present embodiment 1, an example where the lower surface 21 of the support member 2 has the vertical surface 26 and the third horizontal surface 27 has been shown. However, without limitation thereto, for example, the third contact surface 25 may further extend to also form such a protrusion outside the opening 6. However, in this case, the length in the height direction A of the receiving member 3 increases, resulting in decrease in the degree of freedom in the shape of a load to be placed. Therefore, the vertical surface 26 and the third horizontal surface 27 are provided, thereby decreasing the length in the height direction A on the receiving member 3 side of the support member 2. As a result, the length in the height direction A of the receiving member 3 is substantially decreased, so that the degree of freedom in the shape of a load to be placed increases.

The support member 2 has opposed side surfaces to contact with the opposed inner side surfaces 40 in the U-shaped structure of the pillar 4 of the fixture member 1. A fourth contact surface 28 is to contact with the first inner side surface 41. A fifth contact surface 29 is to contact with the second inner side surface 42. A length W1 in the width direction of the support member 2 may be 6 mm, a length W2 in the substantially horizontal direction B of a part to be inserted into the opening 6, of the support member 2, may be 38 mm, and a length W3 in the substantially horizontal direction B of the third contact surface 25 of the support member 2 may be 5 mm. Thus, these lengths may be substantially the same as those of the chip portion 5, as an example. Therefore, the length W2 of the support member 2 is smaller than the length T3 of the opening 6. Therefore, a rear end 2b of the support member 2 does not contact with the pillar 4 when the support member 2 is attached to the opening 6.

In the support member 2, a power supply portion 33 is provided. At the rear end 2b which is an end on the closed side X1 of the U-shaped structure when the support member 2 is attached to the fixture member 1, the power supply portion 33 contacts with the wiring portion 44, to lead power to outside from the open side of the opening 6 of the fixture member 1. The support member 2 has an attachment portion 30 and a groove 31. The attachment portion 30 is used for attaching the power supply portion 33 thereto. The groove 31 communicates with the attachment portion 30 and extends to reach a front end 2a of the support member 2. The power supply portion 33 has a spring electrode 34 and a lead-out wire 35. The spring electrode 34 is attached to the attachment portion 30, for making electric connection with the wiring portion 44. The lead-out wire 35 is connected to the spring electrode 34 and is provided in the groove 31.

The power supply portion 33 only has to be electrically connectable to the wiring portion 44, and is not limited to the case of providing the spring electrode 34. However, it is required to prevent the rear end 2b of the support member 2 from contacting with the pillar 4. This is because, if the rear end 2b of the support member 2 contacts with the pillar 4, the support member 2 becomes such a state as to float in the opening 6, so that contact between surfaces might become unstable or the contact might be lost.

In the case of not providing the power supply portion 33 in the support member 2, as shown in FIG. 11 and FIG. 12, the support member 2 may not have the power supply portion 33, the attachment portion 30, the groove 31, and the like. In this case, although a power supply is obtained, the structure is simplified and the manufacturing is facilitated. Also in this case, the support member 2 is configured so as to prevent the rear end 2b thereof from contacting with the pillar 4, as in the above case.

The receiving member 3 is fixed to a side of the support member 2 opposite to a side thereof to be attached to the opening 6, and supports a shelf member 8 as a load. The support member 2 and the receiving member 3 may be fixed by, for example, welding. Alternatively, the support member 2 and the receiving member 3 may be integrally formed. The receiving member 3 receives a load due to the weight of the shelf member 8.

The support member 2 provided with the receiving member 3 is inserted into the opening 6 of the fixture member 1. A force is applied to the receiving member 3 in a direction of a load, i.e., a direction opposite to an arrow direction indicating the height direction A. How the support member 2 is held in the opening 6 in this case will be described. An upper edge, on the closed side X1, of the first contact surface 22 of the upper surface 20 of the support member 2 contacts with the lower slope surface 54 of the lower surface 50 of the chip portion 5 in the opening 6, and thereby is held. The third contact surface 25 of the lower surface 21 of the support member 2 contacts with the first horizontal surface 53 of the upper surface 51 of the chip portion 5 in the opening 6, and thereby is held. The fourth contact surface 28 and the fifth contact surface 29 which are side surfaces of the support member 2 contact with the first inner side surface 41 and the second inner side surface 42 which are the opposed inner side surfaces 40 of the fixture member 1, and thereby are regulated. That is, the support member 2 is held in the opening 6 by the fixture member 1 owing to the load of the receiving member 3. Therefore, the support member 2 can be attached so as not to move, owing to the weight of the load of the receiving member 3.

The case where a force is applied to the receiving member 3 in a direction opposite to the load direction, i.e., in the arrow direction indicating the height direction A will be described. Such a force is assumed when a person, an object, or the like collides with the receiving member 3 and thereby the receiving member 3 bounces. How the support member 2 is held in the opening 6 in this case will be described. An upper edge, on the open side X2, of the first contact surface 22 of the upper surface 20 of the support member 2 contacts with the lower slope surface 54 of the lower surface 50 of the chip portion 5 in the opening 6, and thereby is held. The second contact surface 24 of the lower surface 21 of the support member 2 contacts with the upper slope surface 52 of the chip portion 5 in the opening 6, and thereby is held. As in the above case, the fourth contact surface 28 and the fifth contact surface 29 which are side surfaces of the support member 2 contact with the first inner side surface 41 and the second inner side surface 42 which are the opposed inner side surfaces 40 of the fixture member 1, and thereby are regulated. That is, the support member 2 is held by the fixture member 1 even if the receiving member 3 bounces. Therefore, the support member 2 can be placed without being moved by a force due to the bounce of the receiving member 3.

The shelf member 8 is composed of a frame body 81, a glass board 82, and an illumination unit 83. The frame body 81 is held by a pair of the receiving members 3. The glass board 82 is held at the center of the frame body 81. The illumination unit 83 is composed of, for example, an LED provided at a lower position on a front surface of the frame body 81. The illumination unit 83 is supplied with power from the lead-out wire 35. In the present embodiment 1, the illumination unit 83 is shown as an example. However, without limitation thereto, anything that requires a power supply and can be physically supported by the receiving member 3 may be provided. For example, various electric devices including a display device such as a liquid crystal panel and a spotlight other than an LED are applicable.

In the support apparatus of the present embodiment 1, the fixture member 1 has a pair of the pillars 4, and the openings 6 in the pair of pillars 4 are formed at substantially the same position in the height direction. A pair of the support members 2 are inserted into a pair of the openings 6 formed at substantially the same position in the height direction in the pair of pillars 4. By a pair of the receiving members 3 for the pair of support members 2, the frame body 81 is held as a load placed over the pair of receiving members 3. A thing other than the frame body 81 can be used. As shown in FIG. 13, a double arm hanger 9 can also be used as a load placed over the pair of receiving members 3.

Without limitation thereto, the fixture member 1 can be formed by a single pillar 4. In this case, for example, as shown in FIG. 13, a hook unit 10 may be used as a load that does not stride over the pillars 4. As shown in FIG. 13, a panel 11 may be provided so that the pillar 4 is not exposed to a display side. Thus, the support apparatus can be set as appropriate in accordance with a usage condition thereof.

In the above configuration, an example where the length T1 in the height direction A of the opening 6 is five times or more greater than the length T2 thereof in the width direction has been shown. This example will be described. In the support apparatus of the present invention, for aesthetic purpose due to the nature of the product, it is desired that the length T2 in the width direction of the opening 6 in the pillar 4 is set to be as small as possible. It is also possible to set the length T1 in the vertical direction of the opening 6 to the same length as the length T2 thereof in the width direction. However, in this case, an allowable range of a load that can be supported by the support member 2 reduces. Therefore, in order to support such a load as to enhance a utility value of the support apparatus, the length T1 in the vertical direction of the opening 6 is set to be five times or more greater than the length T2 thereof in the width direction, and the support member 2 to be inserted into the opening 6 is formed accordingly, whereby a desired load can be held.

Next, how to use the support apparatus of embodiment 1 configured as described above will be described. First, each chip portion 5 is fastened to the pillar 4 with a screw through the screw fastening portion 45 and the screw hole 57. Then, each chip portion 5 is fixed inside the U-shaped structure of the pillar 4. Next, a pair of the pillars 4 in which the chip portions 5 have been fixed are placed on a floor with use of the placement members 7 such that the orientation of the pair of the pillars 4 is kept in the substantially vertical direction A.

Next, a pair of the support members 2 are respectively inserted into the pair of pillars 4, at substantially the same position in the height direction A.

At this time, each support member 2 is inserted with the upper surface 20 and the lower surface 21 thereof being in parallel with and along the upper surface 51 and the lower surface 50 of the chip portions 5 in the opening 6. Thus, the support member 2 is set in the opening 6.

Then, the frame body 81 is fitted to a pair of the receiving members 3 for the pair of support members 2, and thereby is supported. When a power supply is connected to the power supply connection portion 72 of the placement member 7, power is fed through the wiring portion 44 of the pillar 4 and via the power supply portion 33 to light the illumination unit 83 of the shelf member 8.

In the support apparatus of embodiment 1 configured as described above, a plurality of the chip portions are fixed inside the pillar, whereby the openings are formed. The support member is inserted into the opening. Thus, the position where a load is placed can be freely changed in the vertical direction, staggering of a portion supporting the load can be suppressed, exposure of an attachment part of the portion supporting the load can be reduced, and the manufacturing cost can be reduced.

The upper surface of the support member has the second horizontal surface contiguous to the first contact surface, and the lower surface of the support member has the vertical surface contiguous to the second contact surface, and the third horizontal surface contiguous to the vertical surface. Therefore, the structure of the receiving member can be downsized, whereby the degree of freedom in the shape of a load increases.

Each chip portion is fixed to the pillar with a screw, inside the U-shaped structure of the pillar. Thus, the chip portions can be fixed in the pillar, with use of a simple configuration. Therefore, the manufacturing cost can be further reduced.

The fixture member has the wiring portion in the pillar. The support member has the power supply portion which, when the support member is attached to the fixture member, contacts with the wiring portion, to lead power to outside from the open side of the opening of the fixture member. Therefore, at the outside on the open side of the opening, a power supply can be easily obtained.

The power supply portion is composed of the spring electrode and the lead-out wire. Therefore, a power supply can be reliably obtained.

The upper slope surface of the chip portion has a slope angle of about 160 degrees with respect to the substantially horizontal direction. Therefore, since the lower slope surface is parallel with the upper slope surface, a load can be reliably held.

A pair of the pillars are provided, a pair of the support members are provided which are inserted into a pair of openings formed at substantially the same position in the height direction in the pair of pillars, and a pair of the receiving members are provided. Therefore, a load placed over the pair of receiving members can be easily and reliably supported.

Embodiment 2

In the above embodiment 1, an example where the upper surface 51 and the lower surface 50 of the chip portion 5 are sloped so as to become higher from the closed side X1 toward the open side X2 has been described. In the present embodiment 2, an example where the upper surface 51 and the lower surface 50 of the chip portion 5 are sloped so as to become lower from the closed side X1 toward the open side X2 will be described. The configuration other than a part relevant to the above is the same as in the above embodiment 1, and therefore the description thereof is omitted. In the present embodiment 2, an example where the power supply portion is not provided will be described.

Figure 14:
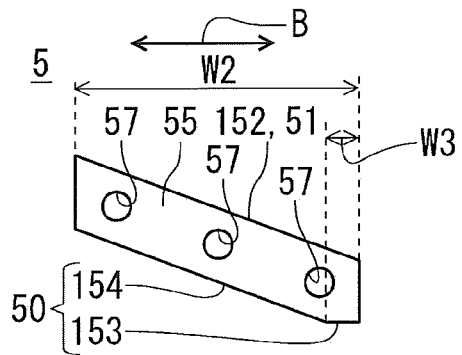
FIG. 14a to FIG. 14e are a left side view, a plan view, a bottom view, a front view, and a back view showing a configuration of a chip portion of a fixture member of a support apparatus in embodiment 2 of the present invention.
Figure 14:
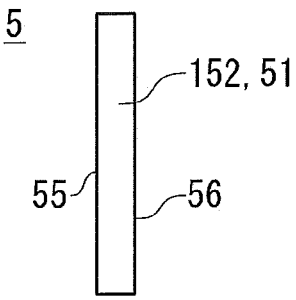
Figure 14:
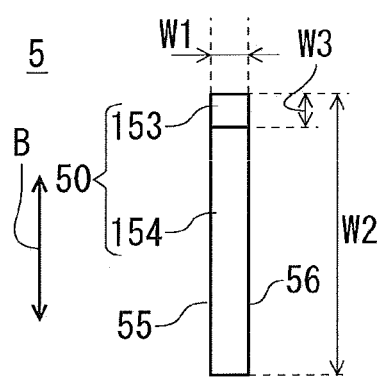
Figure 14:
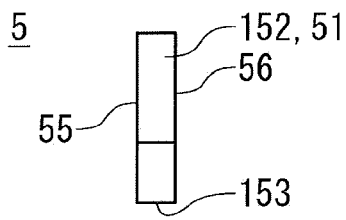
Figure 14:
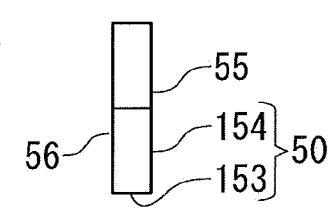

FIG. 14 is a diagram showing a configuration of a chip portion of a fixture member of a support apparatus in embodiment 2 of the present invention. FIG. 14(a) is a left side view, FIG. 14(b) is a plan view, FIG. 14(c) is a bottom view, FIG. 14(d) is a front view, and FIG. 14(e) is a back view. A right side view of the chip portion of the fixture member is symmetric with that in FIG. 14(a).

Figure 15:
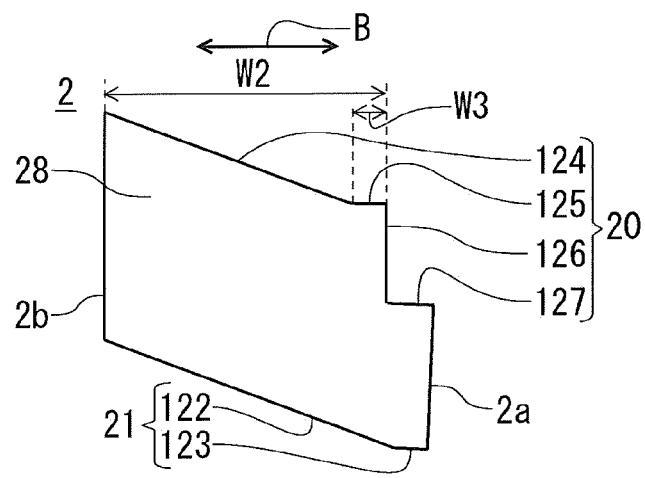
FIG. 15a to FIG. 15e are a left side view, a plan view, a bottom view, a front view, and a back view showing a configuration of a support member of the support apparatus in embodiment 2 of the present invention.
Figure 15:
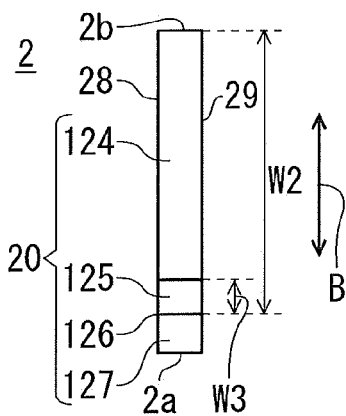
Figure 15:
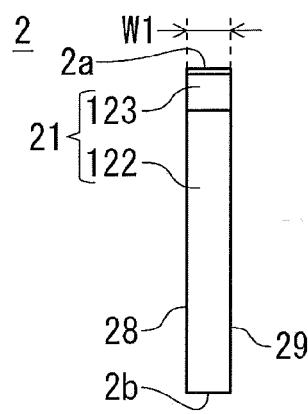
Figure 15:
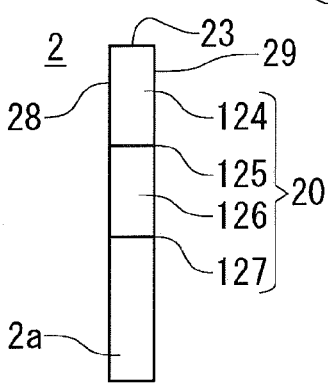
Figure 15:
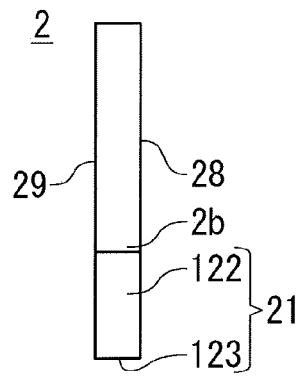

FIG. 15 is a diagram showing a configuration of a support member of the support apparatus in embodiment 2 of the present invention. FIG. 15(a) is a left side view, FIG. 15(b) is a right side view, FIG. 15(c) is a plan view, FIG. 15(d) is a bottom view, FIG. 15(e) is a front view, and FIG. 15(f) is a back view.

Figure 16:
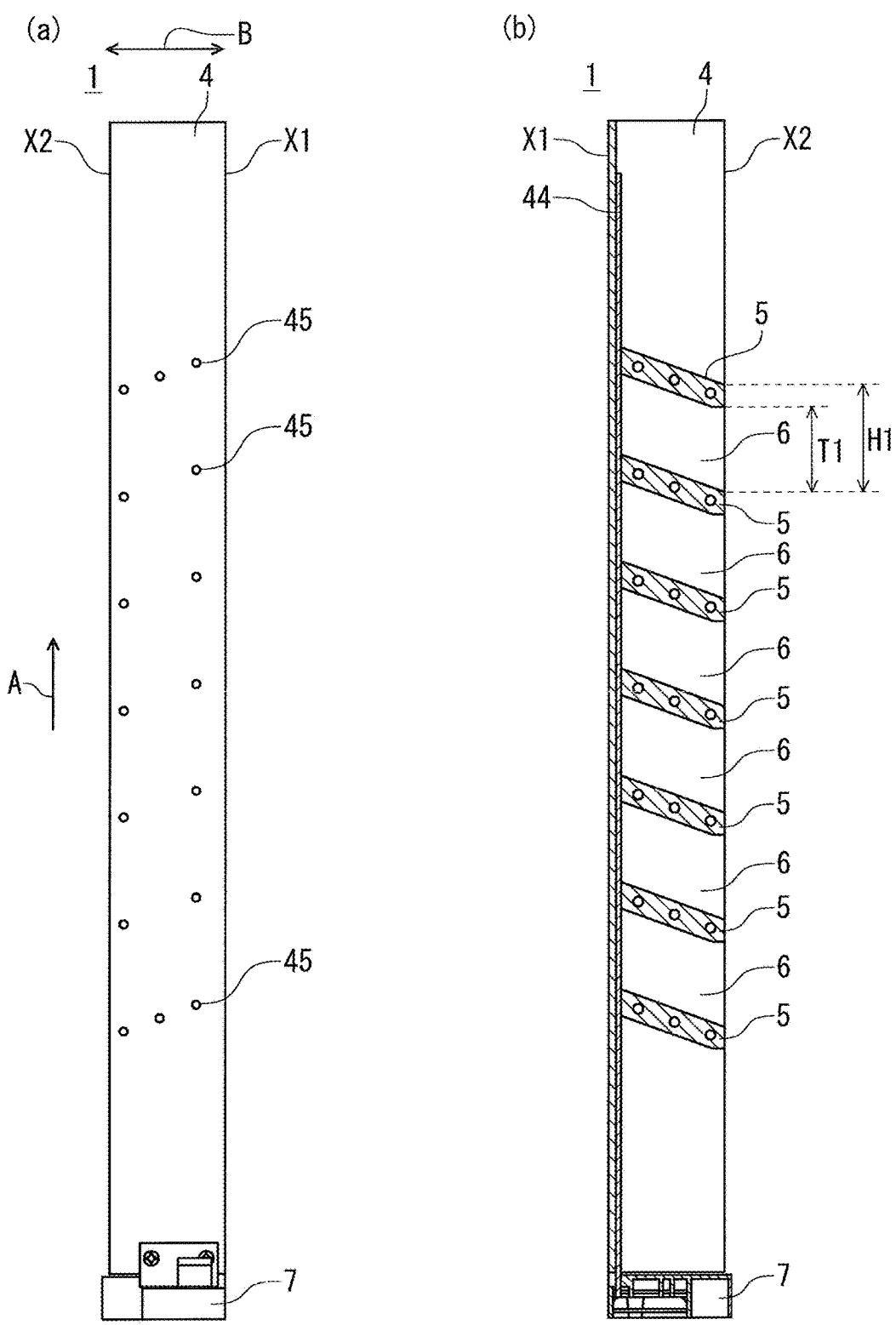
FIG. 16 is inserted into the fixture member and a receiving member is fixed to the support member.

FIG. 16 is a view showing a configuration of the fixture member of the support apparatus in embodiment 2 of the present invention. FIG. 16(a) is a right side view and FIG. 16(b) is a left side sectional view. FIG. 17 is a left side partial sectional view showing a state in which the support member of the support apparatus shown in FIG. 14, FIG. 15, and FIG. 16 is inserted into the fixture member and a receiving member is fixed to the support member.

In the drawings, the same components as in the above embodiment 1 are denoted by the same reference characters, and the description thereof is omitted. The upper surface 51 of the chip portion 5 is formed by an upper slope surface 152. The upper slope surface 152 is sloped so as to become lower from the closed side X1 of the U-shaped structure of the pillar 4 toward the open side X2 thereof. The lower surface 50 of the chip portion 5 is formed by a lower slope surface 154 and a first horizontal surface 153. The lower slope surface 154 is sloped so as to become lower from the closed side X1 of the U-shaped structure of the pillar 4 toward the open side X2 thereof, to reach the open side X2. The first horizontal surface 153 is formed contiguously to the lower slope surface 154 and reaches the open side X2 of the U-shaped structure of the pillar 4. The lower slope surface 154 has a slope angle θ of about 160 degrees with respect to the substantially horizontal direction B. About 160 degrees of the slope angle θ is an optimum example for supporting a load. However, even if there is an error of about ±2 degrees from the above value, the same effect is provided.

The upper slope surface 152 is substantially parallel with the lower slope surface 154. As in the above embodiment 1, as shown in FIG. 16, each chip portion 5 is fixed with a screw penetrating through the screw hole 57 from the first side surface 55 to the second side surface 56 inside the U-shaped structure of the pillar 4 of the fixture member 1, whereby the opening 6 is formed as in the above embodiment 1.

The support member 2 has the upper surface 20 formed by a second contact surface 124, a third contact surface 125, a vertical surface 126, and a third horizontal surface 127. The second contact surface 124 is to contact with the lower slope surface 154. The third contact surface 125 is to contact with the first horizontal surface 153 and is contiguous to the second contact surface 124. The vertical surface 126 is contiguous to the third contact surface 125. The third horizontal surface 127 is contiguous to the vertical surface 126. The third horizontal surface 127 protrudes to outside of the opening 6 when the support member 2 is inserted into the opening 6.

The support member 2 has the lower surface 21 formed by a first contact surface 122 and a second horizontal surface 123. The first contact surface 122 is to contact with the upper slope surface 152. The second horizontal surface 123 is contiguous to the first contact surface 122. The second horizontal surface 123 protrudes to outside of the opening 6 when the support member 2 is inserted into the opening 6. As in the above embodiment 1, the receiving member 3 is fixed to a side of the support member 2 opposite to a side thereof to be attached to the opening 6.

The support member 2 provided with the receiving member 3 is inserted into the opening 6 of the fixture member 1. The case where a force is applied to the receiving member 3 in a direction of a load, i.e., a direction opposite to the arrow direction indicating the height direction A will be described. How the support member 2 is held in the opening 6 in this case will be described. An upper edge, on the closed side X1, of the second contact surface 124 of the upper surface 20 of the support member 2 contacts with the lower slope surface 154 of the lower surface 50 of the chip portion 5 in the opening 6, and thereby is held. A lower edge, on the open side X2, of the first contact surface 122 of the lower surface 21 of the support member 2 contacts with the upper slope surface 152 of the chip portion 5 in the opening 6, and thereby is held. As in the above embodiment 1, the fourth contact surface 28 and the fifth contact surface 29 which are side surfaces of the support member 2 contact with the first inner side surface 41 and the second inner side surface 42 which are the opposed inner side surfaces 40 of the fixture member 1, and thereby are regulated. That is, the support member 2 is held in the opening 6 by the fixture member 1 owing to the load of the receiving member 3. Therefore, the support member 2 can be attached so as not to move, owing to the weight of the load of the receiving member 3.

The case where a force is applied to the receiving member 3 in a direction opposite to the load direction, i.e., in the arrow direction indicating the height direction A will be described. How the support member 2 is held in the opening 6 in this case will be described. The third contact surface 125 of the upper surface 20 of the support member 2 contacts with the first horizontal surface 153 of the lower surface 50 of the chip portion 5 in the opening 6, and thereby is held. A lower edge, on the closed side X1, of the first contact surface 122 of the lower surface 21 of the support member 2 contacts with the upper slope surface 152 of the chip portion 5 in the opening 6, and thereby is held. As in the above case, the fourth contact surface 28 and the fifth contact surface 29 which are side surfaces of the support member 2 contact with the first inner side surface 41 and the second inner side surface 42 which are the opposed inner side surfaces 40 of the fixture member 1, and thereby are regulated. That is, the support member 2 is held by the fixture member 1 under a load due to bounce of the receiving member 3. Therefore, the support member 2 can be placed without being moved by the bounce of the receiving member 3.

Next, how to use the support apparatus of embodiment 2 configured as described above will be described. First, as in the above embodiment 1, each chip portion 5 is fastened to the pillar 4 with a screw through the screw fastening portion 45 and the screw hole 57. Then, each chip portion 5 is fixed inside the U-shaped structure of the pillar 4. Next, the pillar 4 in which the chip portions 5 have been fixed is placed on a floor with use of the placement member 7 such that the orientation of the pillar 4 is kept in the substantially vertical direction A. Next, the support member 2 is inserted into the opening 6 formed by the chip portions 5. At this time, the support member 2 is inserted with the upper surface 20 and the lower surface 21 thereof being in parallel with and along the upper surface 51 and the lower surface 50 of the chip portions 5 in the opening 6. Thus, the support member 2 is set in the opening 6. Then, the receiving member 3 is attached to the fixture member 1 via the support member 2. In the case of providing a pair of the pillars 4, the same configuration as in the above embodiment 1 can be applied.

In the support apparatus of embodiment 2 configured as described above, although the slope directions of the chip portion and the support member are different from those in the above embodiment 1, it is possible to detachably attach the receiving member to the opening formed by the chip portions in the fixture member, as in the above embodiment 1. The lower surface and the upper surface of the receiving member respectively contact with the upper surface and the lower surface of the chip portions. The fourth contact surface and the fifth contact surface of the receiving member contact with the opposed inner side surfaces of the fixture member. Therefore, the same effect as in the above embodiment 1 can be provided.

It is noted that, within the scope of the present invention, the above embodiments may be freely combined with each other, or each of the above embodiments may be modified or abbreviated as appropriate.

The invention claimed is:

1. A support apparatus comprising:
   a fixture member including:
      a pillar comprising a back wall and two side walls, the pillar having an orientation kept in a substantially vertical direction with the back wall and the two side walls extending vertically, and an entirety of the pillar possessing a substantially horizontal sectional shape that is a U-shape defined by the back wall, the two side walls, and an open side opposite the back wall;
      a plurality of chip portions fixed inside a U-shaped structure of the pillar and spaced from each other in a height direction of the pillar, the chip portions being separate structures that each directly contact the back wall and the two side walls inside the U-shaped structure of the pillar;
   and
      an opening formed by a lower surface of an upper one of the chip portions next to each other in the height direction of the pillar, an upper surface of a lower one of the chip portions, and opposed inner side surfaces of the two side walls inside the U-shaped structure of the pillar;
   a support member detachably attached to the opening of the fixture member; and
   a receiving member fixed to the support member and supporting a load, wherein
   the upper surface of each chip portion has an upper slope surface sloped so as to become higher from the back wall of the U-shaped structure of the pillar toward the open side thereof, and a first horizontal surface which is formed contiguously to the upper slope surface and reaches the open side of the U-shaped structure of the pillar,
   the lower surface of each chip portion has a lower slope surface sloped so as to become higher from the back wall of the U-shaped structure of the pillar toward the open side thereof, to reach the open side,
   an upper surface of the support member has a first contact surface to contact with the lower slope surface,
   a lower surface of the support member has a second contact surface to contact with the upper slope surface, and a third contact surface to contact with the first horizontal surface, the third contact surface being contiguous to the second contact surface, and
   opposed side surfaces of the support member respectively have a fourth contact surface and a fifth contact surface to contact with the opposed inner side surfaces of the two side walls of the U-shaped structure of the fixture member.

2. The support apparatus according to claim 1, wherein a length of the opening in the height direction is five times or more greater than that in a width direction.

3. The support apparatus according to claim 1, wherein the support member has: a second horizontal surface contiguous to the first contact surface; a vertical surface contiguous to the third contact surface; and a third horizontal surface contiguous to the vertical surface.

4. The support apparatus according to claim 1, wherein each chip portion is fixed to the pillar with a screw, inside the U-shaped structure of the pillar.

5. The support apparatus according to claim 1, wherein the fixture member has, on the back wall of the U-shaped structure, a wiring portion for feeding power from outside, and
   the support member has, at an end thereof located on the back wall of the U-shaped structure when the support member is attached to the fixture member, a power supply portion which contacts with the wiring portion, to lead power to outside from an open side of the opening of the fixture member.

6. The support apparatus according to claim 5, wherein the power supply portion is composed of a spring electrode to contact with the wiring portion, and a lead-out wire connected to the spring electrode.

7. The support apparatus according to claim 1, wherein the upper slope surface and the lower slope surface of the chip portion are formed in substantially parallel with each other, with a slope angle of about 160 degrees provided with respect to a substantially horizontal direction.

8. The support apparatus according to claim 1, wherein a pair of the pillars are provided,
   the openings of the pair of pillars are formed at substantially the same position in the height direction,
   a pair of the support members are provided which are inserted into the pair of openings formed at substantially the same position in the height direction in the pair of pillars, and
   a pair of the receiving members for the pair of support members support a load placed over the pair of receiving members.

9. The support apparatus of claim 1, wherein
   each of the plurality of chip portions comprises a screw hole extending therethrough in a horizontal direction; and
   the support apparatus further comprises a plurality of screws connecting the plurality of chip portions to the pillar, each one of the plurality of screws being fixed in the screw hole of a respective one of the plurality of chip portions.

10. The support apparatus of claim 1, wherein the pillar consists of the back wall and the two side walls.

\* \* \* \* \*